United States Patent Office 3,453,127
Patented July 1, 1969

3,453,127
FLATTED COATING COMPOSITIONS CONTAINING SILICA AEROGEL AND PROCESSES FOR PREPARING SAME
Ralph Marotta and Harry Teicher, Olivette, Mo., assignors to Monsanto Company, St. Louis, Mo., a corporation of Delaware
No Drawing. Continuation-in-part of application Ser. No. 329,351, Dec. 10, 1963. This application Sept. 23, 1966, Ser. No. 581,432
The portion of the term of the patent subsequent to Feb. 6, 1985, has been disclaimed and dedicated to the public
Int. Cl. C09d 3/82, 3/04
U.S. Cl. 106—192          17 Claims

ABSTRACT OF THE DISCLOSURE

This invention relates to coating compositions containing a film forming solid dissolved in an organic solvent such as a linseed oil-resin varnish and an amount sufficient to reduce the gloss of films prepared from said composition of a finely divided amorphous silica aerogel having the characteristics hereinafter set forth.

---

The subject matter of the present invention was disclosed, in part, in our copending application for Letters Patent, Ser. No. 329,351, filed in the United States Patent Office on Dec. 10, 1963 and now abandoned. This application, Ser. No. 329,351, was copending with our application Ser. No. 317,116 filed Oct. 18, 1963, now abandoned but refiled as application Ser. No. 559,379 on June 22, 1966, now U.S. 3,367,742, and which is a continuation-in-part of application Ser. No. 317,116. The present application should be considered in conjunction with said application Ser. No. 329,351 and considered as a continuation-in-part thereof.

The present invention relates to improved flatted and semi-gloss coating compositions. More particularly, the present invention relates to coating compositions having incorporated therein a class of novel, finely divided, amorphous silica aerogels, especially aerogels which are highly efficient and useful as flatting agents in such compositions. The present invention also relates to flatted transparent coatings or films obtained from such compositions. The present invention further relates to methods of preparing such coating compositions.

It has been proposed heretofore to use certain silica aerogels (hereinafter referred to for convenience of description as prior art silica aerogels) or silica gels in various coating compositions for the purpose of porviding a composition which when applied to substrates produces a clear transparent flatted coating or a coating having a considerably reduced gloss or shine. Such compositions and coatings commonly have been referred to as flatted or semi-gloss compositions and coatings. However, in the coating compositions heretofore used or described the silica employed therein tended to settle out of such compositions (for example, varnishes or lacquers) to form a layer containing agglomerated particles and sometimes even a hard gummy cake which particles and/or cakes are extremely difficult to redisperse to particles of the original size by ordinary stirring.

Attempts have been made to overcome this settling or agglomeration by incorporating in the coating compositions dispersing agents such as nonionic surfactants including for example surface active condensation products or alkyl cyclo alkyl aryl or aryl alkyl mercaptans containing at least 6 carbon atoms and not more than 20 carbon atoms and an alkylene oxide such as ethylene oxide, propylene oxide or butylene oxide. However, while the use of such materials usually prevented agglomeration or hard settling the coatings or films formed from such coating compositions usually had reduced imperviousness to water and also less wear resistance.

In accordance with the present invention it has been found possible to produce flatted coating compositions, particularly varnishes and lacquers, containing a class of novel finely divided, amorphous silica aerogels and in which there is a relatively slight tendency for such aerogel particles to settle to form layers of agglomerated particles. Also the flatted coating compositions of the present invention contain smaller amounts of the novel silica aerogels due to the unexpected increase in the flatting efficiency of such silica aerogels in films or coatings formed from the novel compositions.

It is one object of the present invention to provide improved flatted coating compositions in which the flatting agents comprise novel silica aerogels which tend to remain dispersed in the coating composition.

It is a further object of this invention to provide flatted or semi-gloss coating compositions, particularly flatted or semi-gloss lacquers or varnishes, containing particles of a novel silica aerogel which do not agglomerate or settle out to any appreciable detrimental extent on standing.

It is a further object of this invention to provide novel flatted coatings or films whose protective and decorative properties are not appreciably affected by the silica aerogel particles present therein.

It is a still further object of this invention to provide novel processes for preparing these compositions.

Still further objects and advantages of this invention will become apparent from the following description and the appended claims.

The present invention provides novel coating compositions comprising a film-forming solid or potential film-forming solids, dissolved in an organic solvent therefor and having incorporated therein, in an amount sufficient to reduce the gloss of films prepared from said compositions, a finely divided, amorphous silica aerogel having (1) a particle size in the range of from about 0.1 to about 5.5 microns, (2) an average particle size below about 2.5 microns, (3) an uncompressed bulk density in the range of from about $0.8 \times 10^{-3}$ to about $18.0 \times 10^{-3}$ grams per cubic centimeter, and (4) a pore volume of at least 1000 cubic centimeters per gram of silica aerogel.

The above compositions are generally free of the disadvantages of prior art flatted coating compositions since the agglomeration and hard settling of the novel silica aerogel flatting agent is substantially avoided (without the use of dispersing agents) presumably due to the novel properties of the silica aerogel. Also the coatings formed from the compositions are not detrimentally affected by the presence of the silica aerogel in the coating formed from the coating composition. The novel silica aerogels which are suitable for incorporation in the coating compositions to provide the flatted semi-gloss coating compositions of this invention have been described, as previously mentioned, and claimed in our co-pending U.S. patent application Ser. No. 317,116 filed Oct. 18, 1963, now abandoned but refiled as application Ser. No. 559,-379 on June 22, 1966 and which is a continuation-in-part of application Ser. No. 317,116.

The term "novel silica aerogels" as used herein is intended to mean and include the amorphous, finely divided, silica aerogels described and claimed in the above-referred to co-pending applications. These novel silica aerogels differ from the prior art silica aerogels in having a smaller particle size, a more uniform particle size, e.g. a narrower particle size distribution, a lower density and substantially higher pore volumes than the finely divided prior art silica aerogels.

Preferred novel silica aerogels which are suitable for use in the compositions of this invention and falling within these novel aerogels consist essentially of silica aerogel particles which have (1) a particle size distribution such that from about 35 to 45% by weight of the particles have a particle size in the range of 1 micron and less than 1 micron, and from about 65 to about 55% by weight of the particles have a particle size greater than 1 micron and up to about 5.5 microns, (2) an average particle size of between about 1.8 and 2.2 microns, and (3) an uncompressed bulk density in the range of from about $0.8 \times 10^{-3}$ to about $18.0 \times 10^{-3}$ grams per cubic centimeter, and (4) the aerogel is further characterized in that the pore volume (e.g. the volume of the pores) is in the range of between about 1000 and about 1500 cubic centimeters per gram of silica aerogel.

Particularly preferred novel silica aerogels which are suitable for use in the coating compositions of this invention consist essentially of silica aerogel particles having (1) a particle size distribution such that between about 10% to about 15% by weight of the particles have a particle size of 0.5 micron and less than 0.5 micron, about 25% to about 30% by weight of the particles have a particle size greater than 0.5 micron but less than about 1 micron, about 35% to about 45% by weight of the particles have a particle size of 1 micron and greater than 1 micron but less than 2 microns, from about 15% to about 20% by weight of the particles have a particle size of 2 microns and greater than 2 microns but less than 4 microns and from about 0% to about 5% by weight of the particles have a particle size between about 4 and about 5.5 microns and (2) an average particle size of between about 1.8 and 2.2 microns, (3) an uncompressed bulk density in the range of from about $5 \times 10^{-3}$ to about $12 \times 10^{-3}$ grams per cubic centimeter; and being further characterized in that the pore volume of the pores is in the range of between 1000 and 1500 cubic centimeters per gram of silica aerogel.

The novel silica aerogels employed as flatting agents in the compositions of the present invention may be prepared as described and claimed in our previously referred to U.S. patent applications Ser. Nos. 317,116 filed Oct. 18, 1963 and 559,379 filed June 22, 1966. These aerogels are prepared, in general, by using, as starting material, prior art silica aerogels prepared in accordance with processes described in U.S. Patent 2,093,454 dated Sept. 21, 1936 to Samuel S. Kistler or in accordance with processes described in U.S. Patent 2,285,449 to Morris D. Marshall. Such prior art or starting silica aerogels are ground or comminuted in the presence of super-heated water vapor to obtain the novel silica aerogels employed in the compositions of the present invention. The novel silica aerogels may be most advantageously obtained by comminuting prior art silica aerogels at elevated temperatures in the range of from about 250° C. to about 750° C. and these temperatures are provided by the super-heated water vapor which is usually at temperatures within this range. The starting silica aerogels which are used to obtain the novel silica aerogels may be processed by comminuting such aerogels in an atmosphere of super-heated water vapor in a commercially available air attrition or fluid energy mill, for example a commercial "Jet-O-Mizer" manufactured by the Fluid Energy Processing Equipment Company of Philadelphia, Pa. to obtain the novel silica aerogels employed in the compositions of this invention. Such mills are particularly advantageous in that they are constructed (generally in the form of an annular cylinder) so that air or super-heated water vapor may be forced into the grinding chamber along with the aerogels to be ground, and such chamber is also provided with means for the removal of the comminuted materials. The super-heated water vapor is usually introduced into the comminuting zone through nozzles at a rate sufficient to provide a pressure in the range of from about 1.0 p.s.i.g. to about 200 p.s.i.g. and the pressure in the chamber at the point or points of entry of the super-heated water vapor and the coarse aerogel particles is usually in the range of between about 140 p.s.i.g. to about 150 p.s.i.g.

A particularly advantageous method of preparing the novel finely divided silica aerogels comprises introducing particles of starting silica aerogels having a particle size such that substantially all of the particles pass through a No. 4 mesh U.S. standard screen and substantially all of the particles are retained on a No. 8 mesh U.S. standard screen, into a comminuting zone maintained at a temperature in the range of from about 350° C. to about 750° C. Simultaneously there is introduced into a comminuting zone a plurality of streams of super-heated water vapor at a rate sufficient to provide a pressure in the range of from about 1.0 p.s.i.g. to about 200 p.s.i.g. in the chamber. By so proceeding there is furnished sufficient energy to provide attrition of the aerogel particles and the particles are comminuted to a finely divided state after which they may be withdrawn and separated from the super-heated water vapor at a temperature about 250° C., which is usually the temperature of the super-heated water vapor. However, it is important that the temperature during the separation step be maintained above 250° C. and if such temperature is permitted to drop below 250° C. some of the aerogel particles will become dense and resemble precipitated silicas and the final product will not have the flatting efficiency required of the aerogels employed as flatting agents in the compositions of the present invention.

Surprisingly, in view of the usually adverse effect of water or moisture on silica aerogels referred to in the aforementioned Kistler patent, it has been found possible in accordance with the inventions described and claimed in application Ser. Nos. 317,116 and 559,379 to obtain and prepare the novel silica aerogels employed in the compositions of this invention by a process which comprises comminuting or grinding amorphous, hydrophilic, silica aerogels, for example silica aerogels prepared as described in the aforementioned Kistler and Marshall patents, in the presence of super-heated water vapor. When such amorphous silica aerogels are so comminuted, as previously mentioned, the finely divided particles obtained have a more uniform particle size distribution, a significantly lower bulk density and a significantly higher porosity (e.g. a higher total volume of the pores) than silica aerogels which have been ground in an atmosphere of air as by the teachings of the prior art.

It is to be understood that in the preparation of the novel aerogels employed in the compositions of the present invention, the starting amorphous silica aerogels used and which are prepared according to the processes of the Kistler and Marshall patents, are inherently hydrophilic, that is, readily wettable by water as shown by reference to the Kistler patent. Thus, in the Kistler patent, page 1, right-hand column, lines 6–12, it is specifically disclosed that when such aerogels are treated with water and subsequently dried in the usual manner, there results a material shrinkage of the aerogel and said aerogels are thus converted into xerogels. Hence, it is clear that the Kistler silica aerogels are water-wettable or hydrophilic. It is also clear from the teachings of Nickerson Patent No. 2,870,108, issued Jan. 20, 1959, that the silica aerogels prepared by the processes of the aforereferred to Kistler and Marshall patents are hydrophilic. (See column 3, lines 3–9 of said Nickerson patent.) The hydrophilic or water-wettable nature of the Kistler silica aerogels is also confirmed by the teachings of the Wetzel U.S. Patent No. 2,978,298, issued Apr. 4, 1961 (see column 1, lines 42–51).

The amount of novel silica aerogels which may be employed in the flatted and semi-gloss coating compositions of this invention may vary considerably depending upon the particular film forming solid employed, the amount of organic solvent used and the degree of flatting required. Generally, however, the amount of the novel silica aerogel herein described will be less than the amount of the prior art silica aerogels, which have been employed in the past, due to the unexpectedly better flatting efficiency of the novel silica aerogels herein described. Generally from about 0.25% to about 30% of the finely divided amorphous novel silica aerogels hereinbefore described, based on the weight of the film former, is incorporated in the compositions.

The term "film forming solid" as used herein is intended to mean and include solid polymeric products, hereinafter described, which are dissolved in organic solvents to form coating compositions. A large variety of coating compositions are useful in preparing the compositions of this invention including compositions containing film forming solids comprising the drying oil resin varnishes such as the unsaturated fatty oil resin varnishes for example linseed oil and tung oil varnishes; natural resin unsaturated fatty oil varnishes such as congo or rosin-linseed oil or tung oil varnishes; synthetic resin unsaturated fatty oil or alkyd varnishes such as maleic ester gum, modified phenolic or modified resin-pentaerythritol resin in combination with unsaturated fatty oils such as linseed oil or tung oil and fatty acid or drying oil modified phthalic anhydride-glyceride resins and the like. Other compositions which are useful in preparing the compositions of this invention include the laquer type or coating materials such as the cellulose acetate-acetone lacquer, maleic rosin lacquer, nitrocellulose lacquer, polyvinyl chloride and vinyl chloride-vinyl acetate copolymer lacquer and polymethyl methacrylate resin lacquer which contain the corresponding polymer as the film forming solid. Natural resin lacquers such as copal and shellac lacquers may also be employed. Since the problem of hard settling of silica aerogels is particularly troublesome in the case of drying oil resin varnishes and/or drying oil resin and other lacquers the present invention is particularly directed to overcoming this problem, and accordingly, the preferred coating compositions used in preparing the compositions of this invention are the drying oil resin type of compositions and particularly the drying oil resin varnishes.

The aforementioned problem of agglomeration of particles of the prior art silica flatting agents is particularly troublesome in the case of lacquers which contain in the solvent phase a major proportion of more or less polar solvents such as esters, ketones which constitute the organic solvent in which the above-described film forming solids, e.g. natural and synthetic film forming solids or polymers are dissolved. Examples of such solvents which constitute the organic solvents of the lacquers are liquids such as esters particularly the lower alkyl esters of acetic acid; ketones, particularly acetone methyl ethyl ketone and di-isobutyl ketone; alcohols particularly methanol, ehanol, isopropanol, etc. The above film forming compositions which are commonly referred to as lacquers may also contain the usual additives such as plasticizers, corrosion inhibitors and pigments. Although this kind of coating composition rarely contains pigments the present invention is particularly applicable to clear coating compositions for the purpose of producing transparent flatted but non-pigmented coatings.

Other coating compositions include those found in China-wood oil-phenol-formaldehyde or alkyd resin varnishes. Since varnishes will usually contain about 8 to 40 parts of oil, usually tung oil, per 100 parts of resin the typical varnishes are made by heating the correct quantity of oil very rapidly to about 575° F. The phenol-formaldehyde or alkyd resin is then added to the oil and when cooled to about 400° F. organic solvents are added in an amount to give the finished varnish a viscosity of about 1 to 2 poises and a non-volatile content of about 50–60% of film forming solids. The organic solvent employed in the above-described composition may be any volatile organic solvent including white mineral spirit or medium boiling naphthenic hydrocarbon solvents as well as alcohols.

As noted hereinbefore the amount of novel finely divided silica aerogels incorporated in such coating compositions (e.g. lacquers and varnishes) depends primarily upon the type of varnish desired. In general, the finely divided silica aerogel is used in amounts sufficient to decrease the gloss of the coating but insufficient to materially reduce the clarity, transparency and strength of the coating film. Satisfactory semi-gloss results are obtained by using the gels in from about 0.5 to 3% of aerogel based on the coating compositions solids in the final compositions. In some cases even less than 0.5% by weight of aerogel may be used if only a slightly dulled film is desired. Completely flatted coating compositions may be obtained by using up to 20% of the coating composition solids of the hereinbefore described novel silica aerogels without detracting from the clarity, transparency or strength of the coating film. When the silica aerogels employed in the compositions of the present invention are incoporated into the hereinbefore described varnishes it is preferred to employ from about 1 to about 10% by weight of these aerogels based on the weight of the solids in the final coating mixture for most purposes.

The compositions of this invention are prepared, in general, by dispersing the novel finely divided silica aerogels hereinbefore described, in the coating compositions. This may be accomplished in a variety of ways depending to some extent on the particular coating composition used. For example, when the silica flatting agent is to be incorporated in a vinyl lacquer (such as a vinyl chloride-vinyl acetate copolymer lacquer) which is to be used for coating fabrics it is possible to disperse the flatting agent by stirring it into the lacquer. With wood lacquer and drying oil resin varnishes, where the smoothness of the coating is of importance, it is preferred to grind the novel silica aerogel and the lacquers or drying oil varnishes until the dispersion is smooth and the silica aerogel is in a flocculent condition when the composition is allowed to stand. In the case of lacquer and drying oil resin varnishes it is preferred to grind the coating composition and the novel silica aerogels and then add further increments to build up the solids content of the original grind. Such procedure enables the preparation of fairly consistent coating compositions. In the case of lacquers that are solutions of a film forming material in a solvent which does not require oxidation to produce a useful film, it is not necessary to grind the mixture after the increments of lacquer have been added to the original grind. However, in the case of drying oil resin varnishes best results have been obtained by grinding the composition after each addition of varnishes to the original grind and accordingly this procedure is preferred with drying oil resin varnishes.

The grinding, when such technique is employed, may be carried out in a pebble mill, steel ball mill, a two roller mill or the like. Other forms of grinding apparatus may be used and will be apparent to those skilled in the art. Best results have been obtained by grinding the ingredients in a ball mill. Accordingly, such means are preferred in preparing the compositions of the present invention.

The proportions of ingredients used may be varied considerably depending upon the type of varnish desired, that is, whether it is to be a flat or a semi-gloss varnish and the particular coating composition employed. The coating composition may be used as it is prepared and may comprise, for example, from about 20% to about 60% by weight of solids (e.g. film forming solids and novel silica aerogels) in such instances. On the other hand the coating composition may be thinned down with immiscible relatively non-viscous thinner such a medium boiling aromatic liquid either prior to, during, or after the addition of the novel silica aerogel. In most instances it is preferred to thin the coating composition to a solids content of from about 15 to 35% by weight during the initial grinding operation and at the time the finely divided, novel silica aerogel is added to the coating composition and then to add increments of the coating composition to the resulting grind to build up the solids content of the composition to form about 20 to 50% by weight. For best results it is preferred to grind the initial mixture and the mixture obtained by the addition of coating composition vehicle until the grind is smooth.

The amount of novel silica aerogel which is added to the composition depends primarily upon the type of finish desired. When the finely divided, novel silica aerogels of the type described herein are used it is possible to use smaller amounts than would normally be used in the case of other prior art silica flatting agents to obtain the same reduction in gloss. In general the novel silica aerogel is used in amounts sufficient to decrease the gloss of the coating but insufficient to materially reduce the clarity, transparency and strength of the coating film. Satisfactory semi-gloss results are obtained by using from 0.2% to 20% of novel silica aerogel solids based on the coating composition film forming solids in the final composition. In some cases even less than 0.2% of silica aerogel solids may be used if only a slightly dulled film is desired. Completely flatted coatings may be obtained by using up to 30% of the coating composition solids of a novel silica aerogel without detracting appreciably from clarity, transparency and strength of the coating film. It is preferred to use from about 1% to about 10% of such materials based on the coating composition solids in the final mixture. In carrying out the preparation of the flatted coating compositions the time of grinding may be varied considerably depending upon the grinding medium or vehicle and the type of grinding medium and procedure used. In general the total grinding time varies from between 30 minutes and 10 hours in a pebble or ball mill of which the initial grinding period is from about 15 minutes to 3 hours and subsequent grinding periods are from about 15 minutes to 1 or 2 hours. It is to be understood of course that for certain types of finishes and coating composition aerogel mixtures may be ground for relatively short periods of time and on the other hand the mixture may be overground, that is ground for long periods of time especially when smoothness is desired. In the latter case improved coating smoothness is usually obtained with some loss of flatting efficiency.

Generally, the grinding times required in preparing the compositions of the present invention are shorter than the grinding times required when prior art silicas are used under comparable circumstances.

A further understanding of the compositions of this invention will be obtained from the following specific examples which are intended to illustrate the invention but not to limit the scope thereof, parts and percentages being by weight unless otherwise specified.

Example I

An acidic silica ethanol aquasol having a colloidal silica content of 9.5%, a sodium sulfate content of 0.3%, an ethanol content of 50%, a water content of 40% and containing sufficient free sulfuric acid to provide a pH of about 3.0 (glass electrode) was maintained at a temperature of 20° C. and pumped through a sand filter to remove solid particles suspended therein. Thereafter the sol was pumped through a column of a strong cation exchange resin at an average rate of 130 grams per minute. This column which was 2 inches in diameter and 34 inches high consisted of water insoluble beads of the hydrogen or acid form of "Dowex" 50 (a strong cation exchange resin consisting of water insoluble beads of a copolymer of styrene or ethyl-vinylbenzene and divinyl benzene which copolymer contained nuclear sulfonic acid groups) which is described in vol. 69, pages 28–30 of the "Journal of the American Chemical Society." The cation exchange resin had a capacity of 4.25 milligram equivalents per gram. The ethanol aquasol was allowed to pass through a column until a composite effluent from the column had a pH of about 2.0 (glass electrode) and this composite effluent was substantially free of sodium ions. The composite effluent from the cation exchange resin was next passed downwardly through a column of anion exchange material in sulfate form at an average rate of 130 grams per minute. This column which was 2 inches in diameter and 34 inches high consisted of water insoluble beads of the sulfate form of a strongly basic quaternary ammonium anion exchange resin composed of the reaction product of trimethylamine and a chloromethylate copolymer of about 87% by weight of styrene, 5% by weight of ethyl vinylbenzene and 8% by weight of divinyl-benzene was immersed in sufficient water to cover the beads. The anion exchange material had a capacity of about 1.69 milli-equivalents per gram.

Samples of the effluent from the anion exchange column were analyzed for sulfate ions periodically by titrating the sample with a solution of known concentration of barium perchlorate in isopropanol using thorin as the indicator for excess barium ions. During the major part of the run through this column the sulfate content of the effluent was about 0.005% (calculated as $Na_2SO_4$) and the specific conductance at 20° C. was 93 micro mhos. At this stage the pH of the total effluent was about 4.0.

The bulk of the ethanol aquasol so prepared was charged to an autoclave until 75% of the volume of the autoclave was occupied by the sol. The autoclave was then closed and heated until a pressure of 1900 p.s.i.g. (which was slightly above the critical pressure) was attained during which time the sol was converted in situ to an ethanol aquagel. Heating was continued and ethanol and water vapor were released intermittently from the autoclave to maintain the pressure at 1900 p.s.i.g. until a temperature of 300° C. was attained. This temperature was above the critical temperature of the liquid phase of the ethanol aquagel. The vapor in the autoclave was released slowly until substantially all of the vapor was removed. The autoclave was then cooled. A silica aerogel of excellent quality containing about 99% void spaces and having a specific surface area of 275 square meters per gram was obtained. The silica aerogel so obtained was characterized in having a total pore volume of 720 cubic centimeters per gram (determined as nitrogen at standard temperature and pressure) and having an uncompressed bulk density of $35 \times 10^{-3}$ grams per cubic centimeter. The aerogel was light, friable, fluffy, inherently hydrophilic as aforenoted, and was readily broken into large chunks. A portion of the aerogel so prepared was pre-ground in a laboratory mill in air at room temperature to a particle size in which all of the particles passed through a No. 4 mesh U.S. standard screen and substantially all of the particles were maintained on a No. 8 mesh U.S. standard screen. This pre-ground aerogel was then introduced into the grinding chamber of a "Jet-O-Mizer" fluid energy mill. Simultaneously there was introduced into the chamber through jet nozzles a series of moving streams of super-heated water vapor. The streams of water vapor were introduced into the chamber through the nozzles at a rate sufficient to provide a pressure of between 140 and 150 p.s.i.g. and a temperature of about 300° C. The feed rate of the pre-ground aerogel particles was about 10 pounds per minute. The grinding or comminuting time varied between 30 and 90 seconds. By so proceeding, it was possible to produce finely divided silica aerogels having an average particle size of 1.9 microns and a particle size distribution such that 13% of the particles have a size of 0.5 micron and less, 27% of the particles have a particle size in the range of between 0.5 micron and 1 micron, 39% of the particles have a particle size in the range of between 1 and 2 microns, 17% of the particles have a particle size in the range of between 2 and 4 microns and 4% of the particles have a particle size in the range of between 4 and 5.5 microns. The aerogel so prepared was also characterized in having an uncompressed bulk density of $6 \times 10^{-3}$ grams per cubic centimeter and had a pore volume of 1440 cubic centimeters per gram. The particle size of the particles was measured by the method of Irani and Callis described in pages 84 through 86 of the book "Particle Size" published by John Wiley & Son, New York, N.Y. (1963). The pore volumes were measured by the method of Brunauer, Emmet and Teller described in "Advances in Colloid Science," vol. 1, pages 1–36, published by Interscience Publishers, Inc., New York, N.Y. (1942).

Example II

A lacquer base grind was prepared by grinding 15 parts of a novel silica aerogel, hereinafter described, in 135 parts of a lacquer having the composition described below.

Clear lacquer for base grind: Percent
Butyl acetate _____ 31.8
Butyl alcohol _____ 27.2
Toluene _____ 31.8
Ethanol _____ 3.2
Nitrocellulose _____ 6.0

The silica aerogel employed had an average particle size of 1.7 micron, a particle size distribution such that 12% of the particles had a particle size of 0.5 micron and less, 28% of the particles had a particle size in the range of between 1 micron and 0.5 micron, 40% of the particles had a particle size in the range of between 1 and 2 microns, 16% of the particles had a particle size in the range of between 2 to 4 microns and 4% of the particles had a particle size in the range of between 4.0 and 5.0 microns. The silica aerogel had a loose bulk density of $9 \times 10^{-3}$ grams per cubic centimeters and a pore volume of 1350 cubic centimeters per gram. The grinding was carried out for a period of one hour using a ball mill containing 300 parts of 1 inch flintstone.

At the end of the one hour grinding period the base grind was smooth and it was then diluted with a clear wood lacquer having the composition given below using 100 parts of this wood lacquer for every 7.3 parts of base grind.

Clear wood lacquer: Parts
½ second dry nitrocellulose _____ 10
Maleic-rosin ester gum _____ 4
Castor-oil modified glycerinephthalic anhydride alkyd resin (non-drying) _____ 6
Dibutyl phthalate _____ 2.5
Raw castor oil _____ 2.5
Butyl acetate _____ 11.25
Butyl alcohol _____ 7.5
Ethyl alcohol _____ 11.25
Ethyl acetate _____ 10
Toluene _____ 37.5

The resulting flatted lacquer contained 2.85% of the silica aerogel flatting agent based on the dry film obtainable therefrom. When the lacquer was sprayed on a piece of stained filled maple and the solvent was allowed to evaporate a smooth clear but flatted coating was obtained. When the lacquer was applied to a black plate glass and allowed to dry a smooth coating was obtained which had a reflectance of 15 as measured by a "Photovolt Glossmeter." The loss of reflectance or degree of flatting was determined by light reflectance using a Gardner Multi-Angle Glossmeter which measured the light reflectance photo-electrically. The reflectance measured was taken at a light angle of 60°. After standing 3 months the silica aerogel flatting agent in the lacquer had settled in the form of a voluminous soft precipitate which occupied about ½ of the volume of the lacquer. This precipitate was readily dispersed by simple stirring and provided coatings which were equivalent in every aspect to the coatings formed from freshly prepared lacquers.

A base grind of lacquer was prepared in the same manner as described in the preceding paragraph with the exception that the silica flatting agent was a prior art silica aerogel, that is, a silica aerogel having a pore volume of 600 to 800 cubic centimeters per gram and a bulk density of $35 \times 10^{-3}$. At the end of the 1 hour grinding period the base grind did not give smooth coatings and an additional 6 hours grinding period was required to give a smooth coating. Also, when diluted with the clear wood lacquer as above, the reflectance as measured by the "Photovolt Glossmeter" of the film produced was greater than the first mentioned composition indicating a poor flatting efficiency. After 3 months of storage the flatting agent in the lacquer had settled to form a layer of agglomerated particles in the bottom of the lacquer which layer was extremely difficult to disperse to particles of original size by simple stirring. The resulting dispersion did not give smooth coatings due to the fact that particles of aerogel had agglomerated during storage.

Example III

A portion of the novel finely divided silica aerogel prepared in Example I was added, in an amount of 5% by weight, based on the weight of the lacquer solids, and was ground in a pebble mill for 60 minutes in a cellulose acetate lacquer of the following composition.

Percent
Toluene _____ 9.2
Butyl acetate _____ 11.5
Acetone _____ 26.4
Methyl acetate _____ 24.0
Ethylene glycol monomethyl ether _____ 15.6
Methyl phthalyl ethyl glycollate _____ 9.2
Cellulose acetate _____ 4.1

On standing the silica aerogel flatting agent had settled to some extent but the sediment was loose and voluminous and occupied about two thirds of the volume of the lacquer and was readily dispersed by simple stirring. A coating formed from the lacquer was smooth and had a semi-gloss appearance. A prior art air ground silica aerogel was employed to flat a cellulose lacquer in the same manner as described in the preceding paragraph. After the lacquer was allowed to stand for a few hours the silica aerogel settled to form a layer of agglomerated particles which were difficult to redisperse to their original particle size by simple stirring.

Example IV

Three-tenths part of a silica areogel prepared and ground as described in Example I was stirred into a lacquer containing 7 parts of ethyl cellulose and 93 parts of acetone. After standing for several months the silica aerogel flatting agent had settled to some extent but the settlement was voluminous and occupied about one-half of the volume of the lacquer, it was readily dispersed by simple stirring. A similar lacquer prepared by the use of particles of an air ground silica aerogel showed particle agglomeration within a short period of time, that is, the silica aerogel particles had settled to form a compact layer of agglomerated particles in the bottom of the lacquer which particles were difficult to redisperse to their original particle size by simple stirring. Films cast on black plates had excellent semi-gloss properties.

Example V

A linseeed oil modified glycerin-phthalic anhydride alkyd resin varnish of medium oil length, containing 38% solids and having an acid value of 25 was used as the drying oil varnish.

Fifty-nine parts of the above varnish thinned with 205 parts of medium boiling naphthenic hydrocarbon solvent together with 30 parts of a finely divided novel silica aerogel substantially identical with the novel aerogel described in Example I were ground in a one quart pebble mill at about 60 r.p.m. for a period of about 14 hours to form a mill base or grind. One hundred parts of the varnish were added to the mixture in the pebble mill and the resulting mixture was ground for one hour at 60 r.p.m. Two hundred forty-one additional parts of the varnish were added to the pebble mill and the resulting mixture was ground for a period of one hour at 60 r.p.m. to provide a flat varnish.

The silica aerogel in the varnish remained in a flocculent condition giving a varnish which retained its appearance and properties over an extended period of time. The aerogel in the varnish did not settle to form a hard cake but on the contrary formed a voluminous soft layer which was readily dispersed by simple stirring.

A flatted varnish prepared in the same manner except that an air ground silica aerogel was employed settled readily to form a low volume deposit which deteriorated into a hard gummy mass within a period of two weeks.

Example VI

A phenolic type varnish was first prepared as follows.

One hundred pounds of a pure phenolic resin prepared by heating para tertiary amyl phenol with formaldehyde under alkaline conditions, and 12.5 gallons of alkali refined linseed oil were heated to a temperature of 565° F. within a period of 40 minutes and held at that temperature for an additional period of 90 minutes. Twelve and one-half gallons of tung oil were then added and the batch was heated to a temperature of 525° F. and held at that temperature until it had a viscosity of E. The batch was then cooled and thinned with mineral spirits until it contained 50% solids. Sufficient amounts of cobalt and lead naphthenate were added to the thinned batch to provide 0.03% cobalt and 0.3% lead respectively as metal based on the oil in the batch. Two hundred fifty-eight parts of the above described varnish were thinned with 50 parts of a medium boiling naphthenic hydrocarbon solvent. To this mixture there was added 13 parts of a silica aerogel prepared and ground as described in Example I. The resulting mixture was ground to smoothness in a one quart pebble mill which required about 11 hours. A flat varnish was thus obtained in which the silica aerogel was finely flocculated. After aging 6 months the silica aerogel particles in the varnish were easily redispersed by simple stirring and did not form a hard gummy cake as in the case of a similar varnish prepared with an air ground silica aerogel.

Example VII

A varnish was prepared by first heating 20 gallons of an alkali refined linseed oil and 100 pounds of a phenol modified copal resin having a melting point of 167 to 172° C. and an acid value of 20 to 25 to a temperature of 585° F., after which the mixture was held at this temperature for a period of 40 minutes. Five gallons of bodied linseed oil were then added and the resulting mixture was thinned with mineral spirits until it contained 50% non-volatile matter. Sufficient amounts of cobalt and lead naphthenate were added to provide 0.03% cobalt and 0.3% lead respectively as metal based on the oil in the varnish. A silica flatted varnish was produced from the above varnish using the procedure described in the second paragraph of Example VI. The silica aerogel in the flatted varnish remained in the flocculated condition and did not settle to a hard gummy mass. Varnish films formed from the flatted varnish had excellent clarity and transparency and were essentially flat in appearance.

Example VIII

A linseed oil-ester gum varnish having an oil length of 12.5, and acid value of 5 and containing 55% solids was used as the drying oil varnish.

Two hundred twenty-five parts of the above varnish 56 parts of turpentine and 17 parts of a silica aerogel prepared and ground as described in Example I and having substantially the same bulk density, pore volume and particle size distribution as the silica aerogel described in that example were ground in a pebble mill for a period of 8 hours. Eighty-four parts of the clear varnish were added to the mixture in the pebble mill and the grinding was continued in the mill for an additional three hours. The resulting varnish contained the silica aerogel in flocculated form and provided dry varnish films having a gloss of 50 as measured by a Gardner 60° Glossmeter. After aging for long periods of time that is at least 6 months the varnish appeared to be stable and had substantially the same appearance as the freshly flatted varnish. Varnish films cast from the aged varnish were substantially as smooth and free of agglomerates as the films cast from the freshly prepared films. A flatted varnish prepared in the same manner except that an air ground silica aerogel was employed as a flatting agent settled within two weeks to form a hard gummy non-redispersible mass.

Example IX

A nitrocellulose lacquer grind was first prepared by grinding the ingredients tabulated below, in the proportions shown, in a pebble mill for a period of 6 hours.

| Parts: | Percent |
|---|---|
| Butyl acetate | 26.3 |
| Butyl alcohol | 20.6 |
| Toluol | 30.5 |
| Processed castor oil | 5.1 |
| Denatured alcohol | 2.9 |
| Nitrocellulose | 5.4 |
| Silica aerogel (Example I) | 9.9 |

Two and three-tenths parts of the above lacquer grind were added to 90 parts of a wood lacquer having the following composition.

| Parts: | Percent |
|---|---|
| Nitrocellulose | 10 |
| Maleic-rosin ester gum | 4 |
| Castor oil modified glycerin-phthalic anhydride alkyd resin (non-drying) | 6 |
| Dibutyl phthalate | 2.5 |
| Raw castor oil | 2.5 |
| Butyl acetate | 11.25 |
| Butyl alcohol | 7.5 |
| Ethyl alcohol | 11.25 |
| Ethyl acetate | 10 |
| Toluol | 37.5 |

The composition obtained as described above formed coatings having a gloss of about 50 on a Gardner 60° Glossmeter. The aerogel in the lacquer settled as a soft voluminous layer which remained in a flocculated condition after storage for seven months and was readily dispersed by simple stirring. An air dried silica aerogel in a duplicate lacquer settled to form a difficultly dispersible cake when stored for seven months.

Example X

Portions of the silica aerogel prepared in Example I were incorporated into resin and varnish formulations in the amount indicated below in parts by weight.

| Ingredient | Formulation No. | | | |
|---|---|---|---|---|
| | 1 | 2 | 3 | 4 |
| Vinyl resin | 20.17 | 20.17 | | |
| Alkyd resin | | | 38.52 | 38.52 |
| Organic solvents | 78.28 | 78.28 | 55.45 | 55.45 |
| Novel silica aerogel | 1.55 | 1.55 | 4.75 | 4.75 |

Only a small amount of settling occurred in these samples after 6 weeks of storage on a laboratory shelf. Films were prepared by painting the above formulations on smooth glass surfaces. The films were uniformly painted and permitted to dry. The degree of flatting was determined by light reflectance using a Gardner Multi-Angle Gloss-meter which measured the light reflectance photo-electrically. All reflectance was taken at a light angle of 60°. The lower values indicating the less light reflectance.

Formula No.:

Gloss (Percent light reflected at 60°)
1 ---------------------------------------- 4
2 ---------------------------------------- 8
3 ---------------------------------------- 12
4 ---------------------------------------- 12
Unflatted vinyl resin ---------------------- 89
Unflatted alkyd resin ---------------------- 92

When previously known aerogels which had been ground in air at atmospheric pressure were incorporated in the above-described formulations in place of the novel silica aerogels from 25 to 30% of these prior art aerogels, based on flatted dry film weight, were required to produce films having the same light reflectance as the films prepared in Formulas 1 through 4 of this example. Also such films were grainy and tended to be brittle due to the large amount of silica employed.

What is claimed is:

1. A coating composition comprising a polymeric film forming solid dissolved in an organic solvent therefor and having incorporated therein, a finely divided, amorphous silica aerogel having (1) a particle size in the range of from about 0.1 to about 5.5 microns, (2) an average particle size below about 2.5 microns, (3) an uncompressed bulk density in the range of from about $0.8 \times 10^{-3}$ to about $18.0 \times 10^{-3}$ grams per cubic centimeter and (4) a pore volume of at least 1000 cubic centimeters per gram; said aerogel being present in an amount of from about 0.2% to about 30.0%, by weight, based on the total weight of the film former, and said composition being further characterized as forming a substantially solid film upon the evaporation of said solvent.

2. A composition as in claim 1 wherein the silica aerogel is characterized in having a particle size distribution such that from about 35% to 45% by weight of the particles have a particle size in the range of 1 micron and less than 1 micron, from about 65% to about 55% by weight of the particles have a particle size greater than 1 micron and up to about 5 microns; said silica aerogel being further characterized in having a pore volume in the range of from about 1000 to about 1500 cubic centimeters per gram of silica aerogel.

3. The coating composition as set forth in claim 1 wherein the finely divided amorphous silica aerogel is further characterized by having (1) a particle size distribution such that between about 10% to about 15% by weight of the particles have a particle size of 0.5 micron and less than 0.5 micron, about 25% to about 30% by weight of the particles have a particle size greater than 0.5 micron but less than about 1 micron, about 35% to about 45% by weight of the particles have a particle size of 1 micron and greater than 1 micron, from about 15% to about 20% by weight of the particles have a particle size of 2 microns and greater than 2 microns but less than 4 microns, and from about 0% to about 5% by weight of the particles have a particle size of between about 4 and about 5.5 microns, (2) an average particle size of between about 1.8 and 2.2 microns, and (3) an uncompressed bulk density in the range of about $5 \times 10^{-3}$ to about $12 \times 10^{-3}$ grams per cubic centimeter characterized in having a pore volume in the range of between about 1000 and 1500 cubic centimeters per gram of silica aerogel.

4. A coating composition as in claim 3, wherein the film forming solid dissolved in an organic solvent therefor is a drying oil varnish resin composition.

5. A coating composition as set forth in claim 3, wherein the film forming solid dissolved in an organic solvent therefor is a nitrocellulose lacquer.

6. A coating composition as set forth in claim 3, wherein the film forming solid is an alkyd resin varnish composition.

7. The coating composition as set forth in claim 1 wherein the film forming solid is a drying oil varnish resin which is dissolved in said organic solvent; said resin being present in an amount of from about 20% to about 60% by weight, based on the total weight of the composition.

8. A composition as set forth in claim 7, wherein the silica aerogel is incorporated in said varnish in an amount in the range of from about 0.2 to about 20.0% by weight based on the weight of the coating composition solids in the final composition.

9. A composition as set forth in claim 7, wherein the organic solvent is a mineral spirit.

10. The coating composition as set forth in claim 1 wherein the film forming solid is a nitrocellulose polymer dissolved in said organic solvent, and said silica aerogel is present in an amount of from about 0.5% to about 6% by weight, based on the weight of the nitrocellulose.

11. A composition as set forth in claim 10, wherein the nitrocellulose polymer is present in an amount of between from about 2% to about 30% by weight based on the weight of the composition and the organic solvent is a mixture of equal parts of butyl acetate, butyl alcohol and toluene.

12. The coating composition as set forth in claim 1 wherein the film forming solid is an alkyd resin varnish dissolved in said organic solvent, and said silica aerogel is present in an amount of from about 2% to about 8% by weight, based on the weight of the total solids in the final composition.

13. A process of preparing flatted and semi-gloss compositions which comprises grinding a mixture of a coating composition consisting essentially of a polymeric film forming solid dissolved in an organic solvent therefor and a finely divided amorphous silica aerogel having (1) a particle size in the range of from about 0.1 to about 5.5 microns, (2) an average particle size below about 2.5 microns and (3) an uncompressed bulk density in the range of from about $0.8 \times 10^{-3}$ to about $18.0 \times 10^{-3}$ grams per cubic centimeter and being further characterized in having a pore volume of at least 1000 cubic centimeters per gram of silica aerogel until said silica aerogel remains in a fluocculent condition when said composition is allowed to stand; the amount of silica aerogel employed being an amount of from about 0.2% to about 30.0%, by weight, based on the total weight of the film former, and said composition being further characterized as forming a substantially solid film upon the evaporation of said solvent.

14. The process as set forth in claim 13 wherein said silica aerogel is further characterized by having (1) a particle size distribution such that between about 10% to about 15% by weight of the particles have a particle size of 0.5 micron and less than 0.5 micron, from about 25 to about 30% by weight of the particles have a particle size greater than 0.5 micron but less than 1 micron, about 35% to about 45% by weight of the particles have a particle size of 1 micron and greater than 1 micron, from about 15% to about 20% by weight of the particles have a particle size of 2 microns and greater than 2 microns but less than 4 microns, and from about 0% to about 5% by weight of the particles have a particle size of between about 4 and about 5.5 microns; (2) an average particle size of between about 1.8 and 2.2 microns; (3) an uncompressed bulk density in the range of from about $5 \times 10^{-3}$ to about $12 \times 10^{-3}$ grams per cubic centimeter; and (4) a pore volume in the range of between about 1000 and 1500 cubic centimeters per gram of silica aerogel.

15. A process as in claim 14, wherein the coating composition is a drying oil varnish resin composition.

16. A process as in claim 14, wherein the coating composition is a nitrocellulose lacquer.

17. A process as in claim 14, wherein the coating composition is an alkyd resin varnish.

References Cited

UNITED STATES PATENTS

| | | | |
|---|---|---|---|
| 2,180,145 | 11/1939 | Harford | 106—192 |
| 2,717,214 | 9/1955 | Marotta et al. | 106—192 |
| 3,079,234 | 2/1963 | Jenkins et al. | 23—182 |
| 3,367,742 | 2/1968 | Marotta et al. | 23—182 |

FOREIGN PATENTS 784,391  10/1957  Great Britain.

ALLAN LIEBERMAN, *Primary Examiner.*

U.S. Cl. X.R.

106—241, 253; 260—18, 19, 22, 24, 37, 40